E. N. SPRINKLE.
Churn.
No. 25,985.
Patented Nov. 1, 1859.
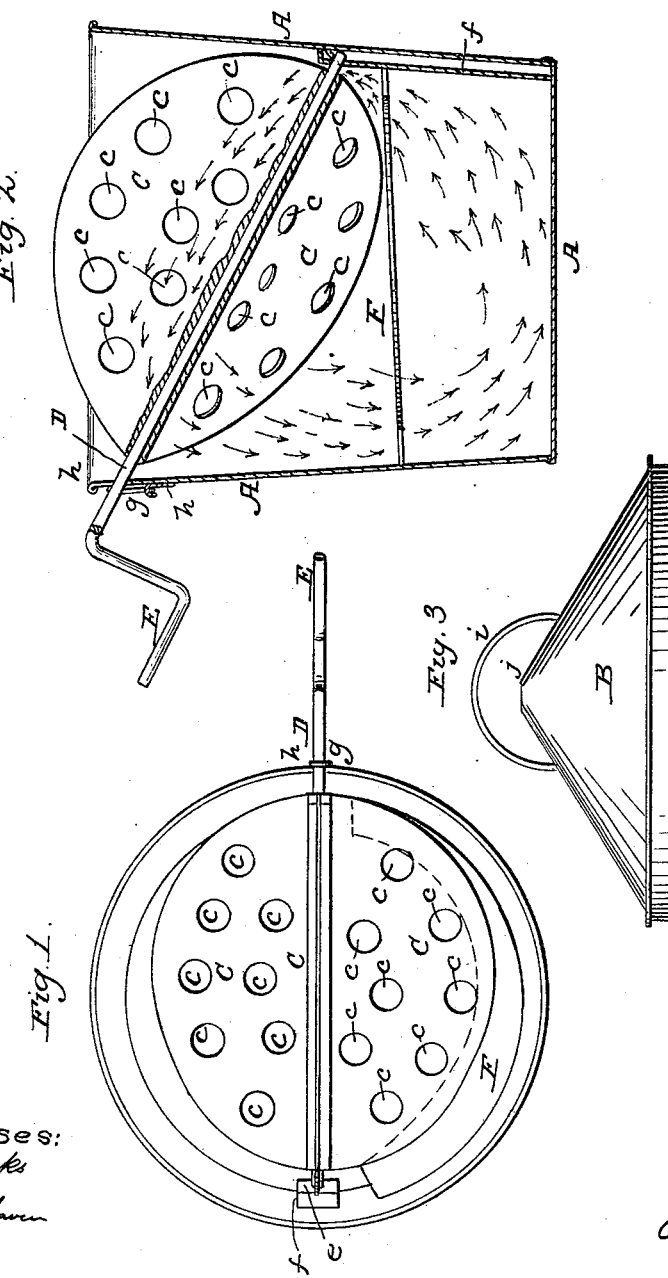

UNITED STATES PATENT OFFICE.

E. N. SPRINKLE, OF MARION, VIRGINIA.

CHURN.

Specification of Letters Patent No. 25,985, dated November 1, 1859.

*To all whom it may concern:*

Be it known that I, E. N. SPRINKLE, of Marion, in the county of Smyth and State of Virginia, have invented a new and useful Improvement in Churns; and I do hereby declare that the following is a full and exact description thereof, reference being had to the accompanying drawings and to the letters of reference marked thereon.

Figure 1 is a top view of my improved churn, with the cover B, removed. Fig. 2 is a vertical section, and Fig. 3 is a side view of the cover.

In the accompanying drawings A, represents the body of the churn which is somewhat larger at the top than at the bottom.

C, C, C, represents the dashers which are perforated with holes c, c, c. The perforated dashers C, C, C, are attached to a shaft or spindle D, by which they are rotated. The shaft or spindle D, is placed in an oblique position as fully shown in Fig. 2. The lower end of the spindle or shaft D, has its bearing at e, in a standard or bearing piece f, which rises from the bottom of the churn, while the upper end rests in a slot h, cut in the top of the churn, and is held in place by a link or catch g, which takes or hooks into an eye h', fastened to the churn.

To one side of the churn just below the lower end of the dashers C, is attached an inclined guard F, the end next the bottom of the spindle or shaft D, being the highest.

The cover B, is provided with a ventilating hole j, and with a lifting ring or wire i.

The operation is as follows viz:—The desired quantity of cream being placed in the churn, the cover is put on, and by means of the crank E, a rapid motion is communicated to the shaft or spindle D, and to the perforated dashers C, C, C. The motion being such as to cause the cream to move in the direction indicated by arrows in Fig. 2.

By reason of the dashers being operated in an oblique position, it will be seen that the cream will not only be forced down but will also be forced toward the side of the churn which supports the upper end of the dasher shaft, and is thus not only effectually agitated by the motion of the dashers, but is also cut and stirred by the edges of the perforations c, c, c, in the dashers, while the cream which is forced down to the bottom of the churn is prevented from raising up the side thereof by the guard F, which in consequence of its inclination directs the cream toward the lower ends of the perforated dashers, as indicated by red arrows in Fig. 2, to be acted upon again.

From an examination of the bottom of the churn, as shown in Fig. 2, it will be seen that the bottom of the churn is free from obstructions or anything to interfere with the gathering and removing of the butter therefrom and that no portion of the churn has to be removed below the dashers in order to clean out the bottom of the churn.

Having thus described my improved churn, what I claim therein as new, and desire to secure by Letters Patent, as an improvement on the churn patented to Hatfield and Goldsmith on the 13th of July, 1858, is:—

The combination of the perforated obliquely arranged dashers C, C, C, with the single inclined stationary guard F, substantially as and for the purposes set forth.

E. N. SPRINKLE.

Witnesses:
  W. HENRY TRUCKS,
  JNO. S. COPENHAVER.